Oct. 18, 1966 W. C. BRENNER ETAL 3,280,349
MAGNETOHYDRODYNAMIC GENERATING SYSTEM
Filed Oct. 21, 1963 3 Sheets-Sheet 1

WITNESSES
Theodore F. Wrobel
Edward F. Possessky

INVENTORS
William C. Brenner
Istvan Tuba
BY
ATTORNEY

Oct. 18, 1966  W. C. BRENNER ET AL  3,280,349
MAGNETOHYDRODYNAMIC GENERATING SYSTEM
Filed Oct. 21, 1963  3 Sheets-Sheet 2

United States Patent Office 3,280,349
Patented Oct. 18, 1966

3,280,349
MAGNETOHYDRODYNAMIC GENERATING SYSTEM
William C. Brenner, Fox Chapel, and Istvan Tuba, Pittsburgh, Pa., assignors to Westinghouse Electric Corporation, Pittsburgh, Pa., a corporation of Pennsylvania
Filed Oct. 21, 1963, Ser. No. 317,671
9 Claims. (Cl. 310—11)

The present invention relates to magnetohydrodynamic generating systems and more particularly to generating duct arrangements therefor.

According to magnetohydrodynamic (hereinafter referred to as MHD) theory, an electric voltage is generated between electrodes on spaced walls of a duct along which an ionized fluid or gas is transported and in which a magnetic field is established transversely of both the interelectrode direction and the flow direction of the gas. This theory is a special case of the more general electromagnetic induction theory of Faraday according to which an electro-motive force or voltage is induced in an electric circuit whenever the magnetic flux linking the circuit changes. As is well known in electromechanical machines, the Faraday theory accounts for voltage generation in copper or other solid conductors with which flux linkages continually undergo change by movement of the conductors through a magnetic flux field or by movement of a magnetic flux field across the conductors.

In an MHD system, a flowing ionized gas is given the role of a conductor or conducting medium undergoing motion through a magnetic flux field, and an electric field and a corresponding voltage are produced across the moving gas in a direction determined by well known directional rules of electromagnetic induction. Such induced voltage appears across the aforementioned electrodes between which the gas is channeled, and when a load circuit is connected across the electrodes current is generated and circulated through the completed circuit.

Further considerations provide an elaboration of MHD theory so that the generated voltage and other operational characteristics obtained from a given generating system can be predicted with a reasonable degree of certainty. For example, generated voltage and current are dependent upon physical parameters (including electric conductivity, temperature, pressure and velocity) of the gas (which can comprise combustion products as well as seed atoms or molecules of a low ionization potential element such as cesium or potassium) and the manner in which such parameters dynamically undergo change particularly as the gas flows through the generating duct arrangement. The magnetic flux field and the physical properties of structural material such as magnetic permeability, electric resistivity or conductivity and temperature-strength characteristics are also significant factors in voltage and current determination. More comprehensively, the operational nature of an MHD generating system is susceptible to mathematical analysis, and such analysis in terms of flow, electromagnetic and thermodynamic principles is available in recent research and patent literature, with reference particularly being given to a copending application, Serial No. 202,714, entitled Magnetohydrodynamic Generator Apparatus, filed by Stewart Way on June 15, 1962 and assigned to the present assignee.

In applying MHD theory to obtain efficiently operative systems, numerous structural problem areas are encountered, and one of these areas is that related to producing a magnetic flux field in the generating duct arrangement with efficiency and economy. In order to obtain or approach uniformity in voltage generation as a function of position along the length of the generator duct, and thereby avoid internal circulating currents, one preferred arrangement is that in which opposing electrodes are uniformly spaced from each other and the magnetic flux field is uniformly distributed along or throughout the duct. Further, the duct may have an increasing flow channel cross section along its length in order that the flowing gas can expand without increasing velocity as its pressure drops as a result of having given up energy in performing work. Velocity maintenance thus provides a basis for uniform voltage generation as a function of duct length, since the generated voltage varies as a function of conductor (gas) velocity.

With the spacing between opposing electrodes or electrode bearing walls fixed for voltage generating uniformity, increasing duct cross section can be obtained by increasing the spacing between non-electrode wall surfaces along the duct length when such wall surfaces are provided. In any event, such increasing cross section within a duct passage leads to inefficiency in magnetic flux production since magnet size and rating are determined by the flux to be established in the largest section of the duct and such magnetizing capacity is in excess of that which would otherwise be needed to establish the same flux across the smaller duct sections. The question is thus generally as to whether magnetic flux can be produced uniformly along a duct of increasing flow channel section in an optimum manner such that otherwise excess and costly flux producing capacity is avoided.

The present invention provides a structural arrangement which achieves this goal. Thus, in accordance with the broad principles of the invention, an MHD generating system comprises an elongated generating duct arrangement through which an ionized high temperature gas is transported and along which there is disposed magnetic flux producing means. The duct arrangement has uniformly spaced opposing electrodes and is substantially uniform in cross dimension along its length, but it is divided into two or more longitudinal compartments which increase in cross dimension from the opposite ends of the duct arrangement. Ionized gas is thus transported through the separate duct compartments in opposing or counterflow longitudinal directions.

Thus, it is an object of the invention to provide a novel MHD generating system in which voltage and current are efficiently generated.

It is another object of the invention to provide a novel MHD generating system in which substantially uniformly distributed magnetic flux is efficiently produced.

An additional object of the invention is to provide a novel MHD generating system having a generating duct arrangement in which ionized gas flows bi-directionally so that magnetic flux generating means can be provided with optimal capacity.

These and other objects of the invention will become more apparent upon consideration of the following detailed description along with the attached drawings, in which.

Figure 1:
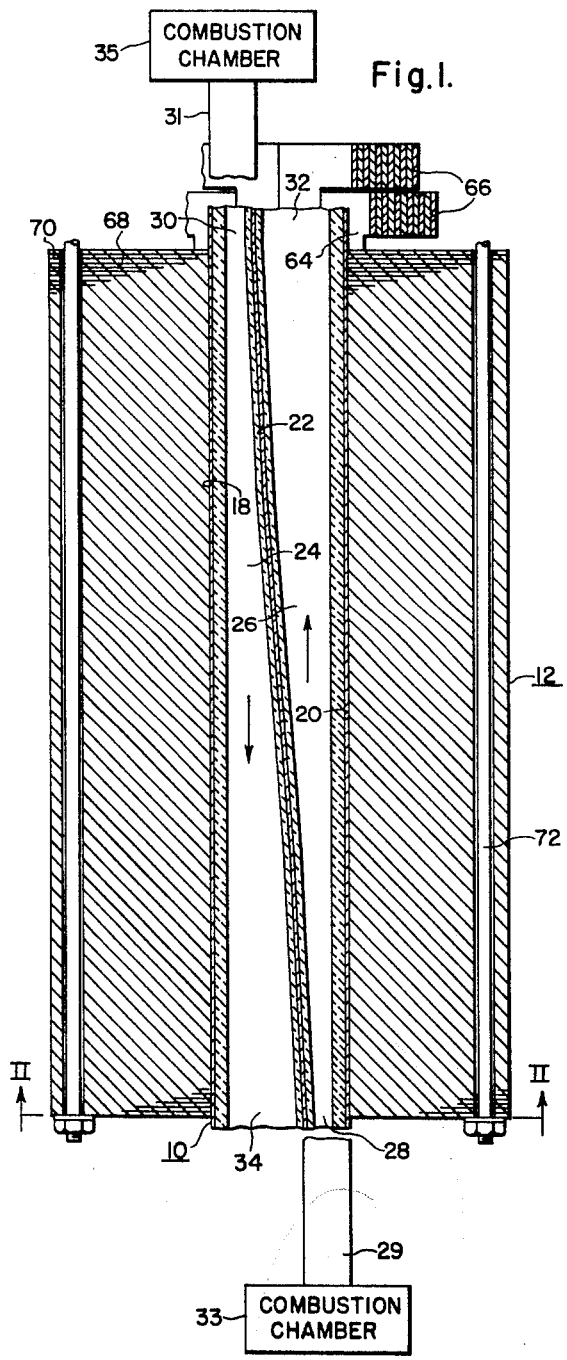
FIGURE 1 shows a longitudinal section of the generating portion of an MHD system constructed in accordance with the principles of the invention.
Figure 2:
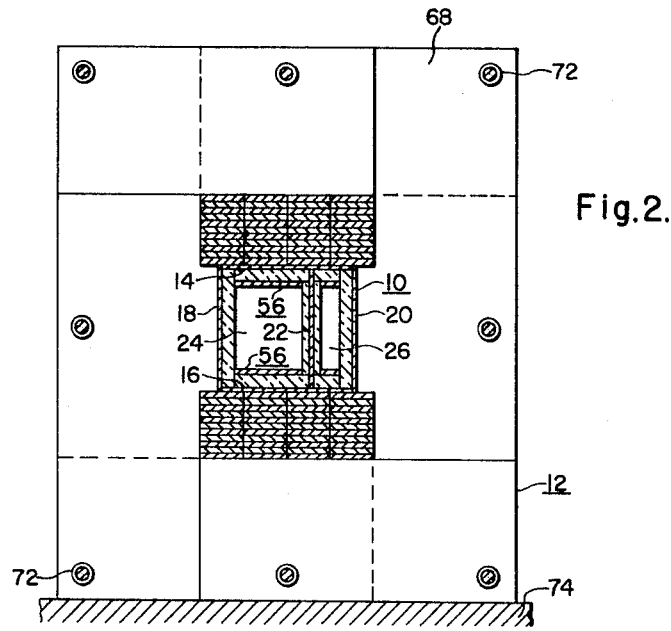
FIGURE 2 shows a cross section of the generator taken along the reference line II—II of FIGURE 1.

More specifically, there is shown in FIGURES 1 and 2 an elongated generating duct or generating passage arrangement 10 and an elongated magnet 12 forming the generating portion of an MHD system. If the ionized working fluid or gas is formed by combustion products, the MHD system for example can comprise an air intake compressor (not shown) from which pressurized air is transported to a combustion chamber (not shown) where it is modified in its makeup by the products of combustion and where the resulting gaseous mixture is heated to a relatively high temperature, for example 2500° Kelvin. Highly ionizable seed atoms or molecules, such as those of cesium or potassium, can be injected into the gas by suitable means (not shown) so as to improve current generating performance in the duct arrangement 10, and such seed atoms or molecules can subsequently be substantially reclaimed from the gas stream by suitable means.

Heat exchange apparatus (not shown) can be provided in the MHD system where such is needed for the purpose of heat recovery from circulated coolants or for other purposes. A separate power source (not shown) can be provided to energize the magnet 12. Other apparatus serving various cooperative or incidental system functions can be employed depending upon the functional needs of a particular MHD system.

The duct arrangement 10 is provided with a uniform lateral periphery along its length so that optimally minimum magnetic flux producing capacity is required to establish a given magnetic flux uniformly in the duct arrangement 10. Although such lateral periphery can have annular or other form, it is preferably generally rectangular or square (for example, 106″ wide by 96″ high) and is formed by upper and lower electrode bearing walls 14 and 16 (FIG. 2) and respective sidewalls 18 and 20 across which the magnetic flux is to be directed. The duct walls 14–20 can be formed from a structural material such as stainless steel and, for example, may be about 57 feet long in one particular embodiment of the invention.

An elongated partition wall 22 is suitably supported between the sidewalls 18 and 20, as by attachment to the walls 14 and 16, and extends longitudinally of the duct arrangement 10 at an angle with the longitudinal centerline so as to provide a pair of flow channels 24 and 26 which are co-extensive yet which are tapered in width, preferably identically, in opposite longitudinal directions. Thus, ionized conductive gas enters the duct channel 26 through its narrow inlet 28 from a duct extension 29, whereas ionized or conductive gas enters the duct channel 24 through its narrow inlet 30 from another duct extension 31. The duct channels 24 and 26 thus provide counterflow paths of expanding width from the narrow inlet 28 or 30 to the wider outlet 32 or 34. In this manner the expanding gas which suffers a pressure drop across the gas flow path in each channel 24 or 26, resulting primarily as a result of having given up energy in performing work, can flow at substantially constant velocity.

As another example, if the duct configuration is annular, as more fully described in copending application Serial No. 318,260 filed by W. C. Brenner on October 23, 1963 and assigned to the present assignee, counterflow channels similar to the channels 24 and 26 can be provided by radial partition walls.

Induced voltage between the generating duct electrode walls 14 and 16 is given by the relationship:

$$E \propto uBd$$

where:

$u$ = gas velocity,
$B$ = magnetic flux density between the side walls 18 and 20, and
$d$ = the distance between the electrode surfaces on the electrode walls 14 and 16;

therefore induced generator voltage as a function of position along the length of the duct arrangement 10 is substantially constant. This is because the gas velocity is constant, the distanct $d$ between the electrode walls 14 and 16 is preferably uniform along the length of the duct arrangement 10 (as can be observed in FIG. 2) and the magnetic flux density as a function of position along the length of the duct arrangement 10 can be made to be substantially constant. Further, such voltage constancy is provided while minimum flux producing capacity is needed in the magnet 12 since the width of the duct path across which the magnetic flux must be established is a constant along the length of the duct arrangement 10 as determined by the distance between the sidewalls 18 and 20.

Separate burners or combustion chambers 33 and 35 or other ionizing means can be connected respectively to the duct extensions 29 and 31 adjacent the channel inlets 28 and 30 so as to provide gas transport through the channels 28 and 30, or a single burner or combustion chamber (not shown) can be provided for connection to one of the channel inlets 28 or 30 with the outflow from one channel 24 or 26 directed to the inlet 28 or 30 of the other channel 26 or 24. If desired, however, suitable reheating can be provided in the flow stage between the channels 24 and 26. In either event, the gas outflow from the channels 24 and 26 can be ultimately directed to a diffuser (not shown) for velocity letdown and seeding material, if employed, can then be reclaimed prior to exhaust.

Figure 6:
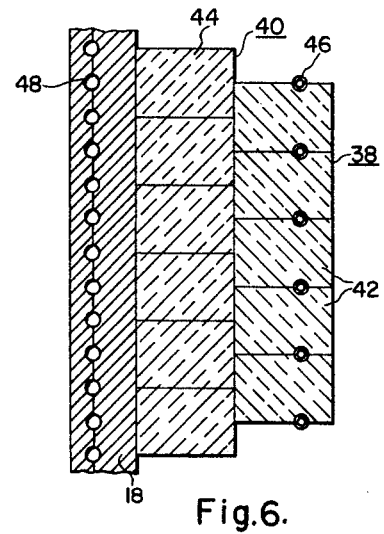
FIG. 6 shows a portion of a side wall with greater detail than that shown in the cross section of FIGURE 3.
Figure 7:
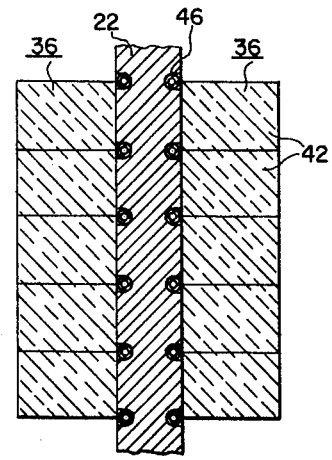
FIG. 7 shows a portion of a partition wall with greater detail than that shown in the cross section of FIGURE 3.
Figure 3:
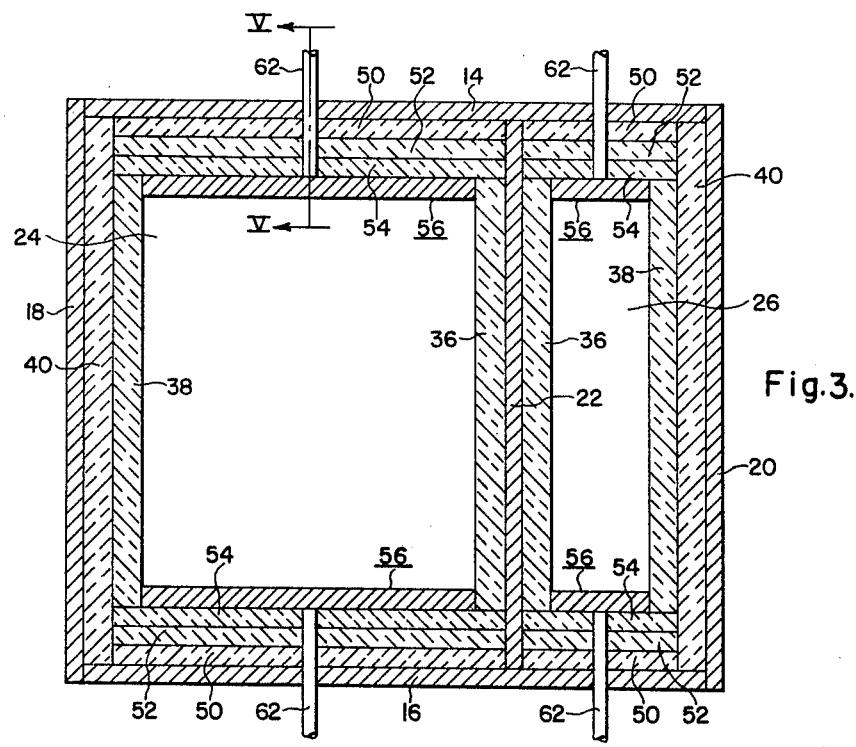
FIG. 3 shows an enlarged cross section of a generating duct employed in the generator of FIGURE 1.
Figure 4:
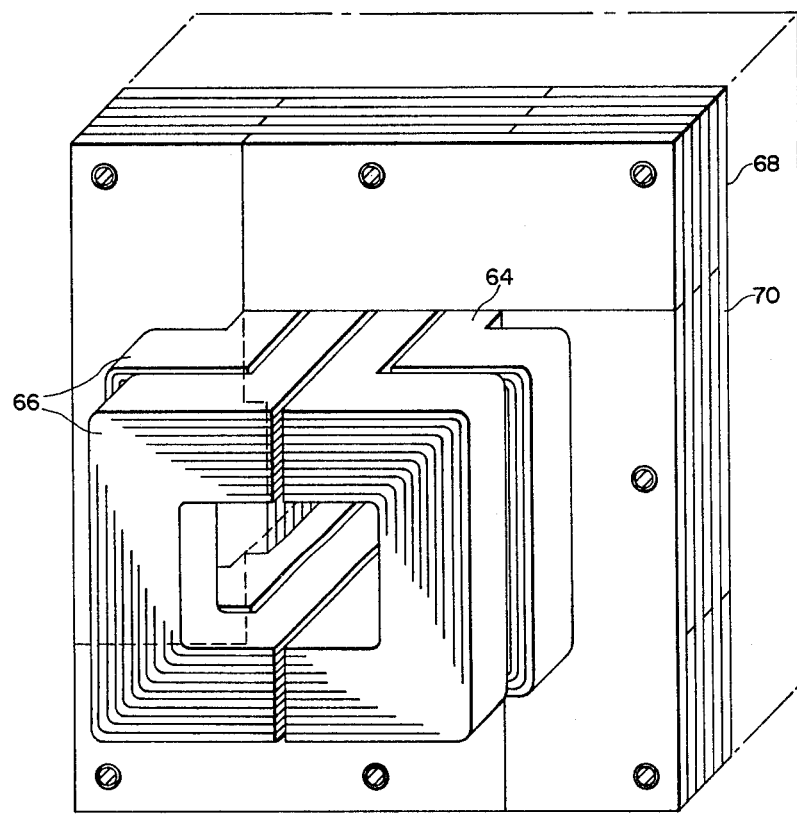
FIG. 4 shows a perspective view of one end portion of a generator magnet employed in the generator of FIGURE 1.
Figure 5:
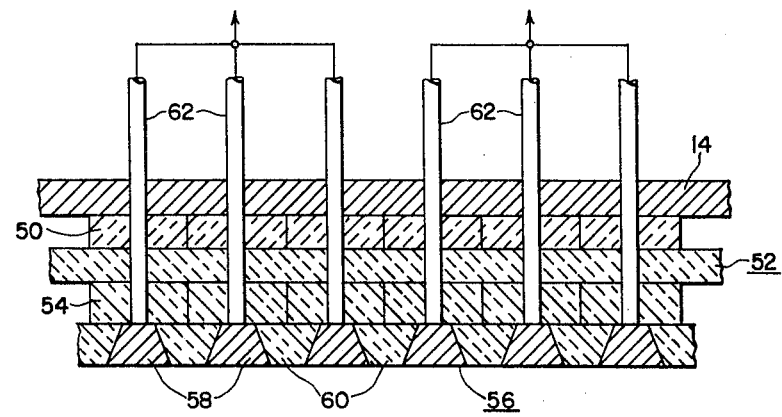
FIG. 5 shows a portion of an enlarged longitudinal section taken along the reference line V—V of FIGURE 3.

As shown in greater detail in FIGURE 3, the sidewalls 18 and 20 and the channel partition wall 22, are preferably suitably lined with thermally insulative material such as zirconia so as to obtain desired electrical resistivity properties and to minimize duct heat loss. Thus, a layer 36 of zirconia is provided on each side of the channel partition wall 22 and a layer 38 of zirconia is provided inwardly of each sidewall 18 or 20. In addition, a layer 40 of firebrick can be provided between each sidewall 18 or 20 and the zirconia layer 38 for added thermal insulating effect. As shown in FIGURES 6 and 7, the zirconia liners 36 and 38 can be formed from brick-like members 42 suitably interlocked or secured in place. Similarly, the firebrick liner 40 can also be formed from brick-like members 44 suitably secured in place.

A coolant system 46 can be incorporated in or adjacent to the zirconia liners 36 and 38 so as to maintain liner resistivity at a satisfactory level at elevated temperatures (since liner conductivity tends to rise with rising temperature) and liquid sodium or the like can be circulated as the coolant in the coolant system 46. The sidewalls 18 and 20 can if desired be separately cooled with another coolant system 48 in which water or other coolant material can be used.

The electrode bearing walls 14 and 16 can also be suitably lined (and cooled) for similar reasons, for example respective lining layers 50, 52 and 64 of firebrick, alumina and zirconia can be disposed on the electrode bearing walls 14 and 16. In this instance, a separate combination of layers 50, 52 and 54 is preferably provided on each wall 14 or 16 in each flow channel 24 or 26 because of the dividing effect of the duct partition wall 22.

An innermost electrode bearing layer 56 is disposed on each zirconia layer 54, and the electrode bearing layer 56 can, as shown, comprise a plurality of tapered electrode members 58 and tapered insulative electrode spacers 60 arranged in alternate order to obtain mutual support. The insulative spacers 60 can be formed from zirconia and the electrode members 58 can be formed from a high temperature strength, electrically conductive material such as zirconium boride with the short side thereof preferably disposed toward the associated wall 14 or 16 so that respective terminals 62, which are suitably secured to the electrode members 58, support the layer 56 in place.

The terminals 62 in turn extend through the layers 54, 52 and 50 and the duct wall 14 or 16 and are suitably secured to the latter. External circuitry can thus be readily connected to the generator terminals 62.

The magnet 12 in this instance laterally encloses the elongated generating duct arrangement 10, and it is provided with longitudinally extending windings 64 (FIGURE 1) so as to establish a predetermined level of uniformly distributed flux across the generating duct sidewalls 18 and 20 when the windings 64 are suitably excited, for example by a motor generator set (not shown). End turns 66 of the windings 64 are preferably disposed longitudinally outwardly of magnet iron 68 and outwardly of the duct arrangement 10.

The magnet iron or core 68 generally encompasses the windings 64 along the length of the generating duct 10 so as to provide a low reluctance flux path externally of the duct arrangement 10 and thereby minimally optimize the required magnetomotive force needed to establish the predetermined level of flux in the duct arrangement 10. The magnet iron 68 further is preferably provided in economically sized sections as indicated by the reference character 70, and each section 70 can, for example, be approximately 14" in thickness.

A plurality of elongated bolts 72, having a diameter of 1 foot for example, can be employed to secure the sections 70 together in forming the magnet iron 68. The enitre generating portion of the MHD system, including the magnet 12 and the generating duct arrangement 10, can be disposed on a supporting member or foundation as indicated by the reference character 74 in FIGURE 2.

Wtih the generating duct arrangement 10 structured as described, voltage is generated efficiently and uniformly along the length of the duct arrangement 10. The employment of gas counterflow in the separate duct channels 24 and 26 enables such uniformity while the required flux producing capacity of the magnet 12 is optimally low since the space between the duct sidewalls 18 and 20 is uniform along the duct length.

The foregoing description has been presented only to illustrate the principles of the invention. Accordingly, it is desired that the invention be not limited by the embodiment described, but, rather, that it be accorded an interpretation consistent with the scope and spirit of its broad principles.

What is claimed is:

1. A magnetohydrodynamic system comprising an elongated generating duct substantially encompassed along its length by an elongated magnet arranged to produce magnetic flux substantially uniformly across said generating duct, said generating duct having a pair of longitudinally extending and suitably insulated electrode bearing walls, and a pair of longitudinally extending and suitably insulated sidewalls uniformly spaced from each other along the duct length and connecting said electrode bearing walls together along opposite longitudinally extending sides thereof, and at least one partition wall disposed between said sidewalls but extending generally longitudinally at an angle with said sidewalls and connecting said electrode bearing walls so as to divide said generating duct into at least two counterflow channels of increasing width in opposite longitudinal directions.

2. A magnetohydrodynamic system comprising an elongated generating duct substantially encompassed along its length by an elongated magnet arranged to produce magnetic flux substantially uniformly across said generating duct, said generating duct having a pair of longitudinally extending and suitably insulated electrode bearing walls substantially uniformly spaced from each other along the duct length, said generating duct further having longitudinally extending and suitably insulated sidewalls uniformly spaced from each other along the duct length and connecting said electrode bearing walls together along opposite longitudinally extending sides thereof, and at least one partition wall disposed between said sidewalls but extending generally longitudinally at an angle with said sidewalls and connecting said electrode bearing walls so as to divide said duct arrangement into at least two counterflow channels of increasing width in opposite longitudinal directions.

3. A magnetohydrodynamic system comprising an elongated generating duct substantially encompassed along its length by an elongated magnet arranged to produce magnetic flux substantially uniformly across said generating duct, said generating duct having a pair of longitudinally extending and suitably insulated electrode bearing walls substantially uniformly spaced from each other along the duct length, said generating duct further having longitudinally extending and suitably insulated sidewalls uniformly spaced from each other along the duct length and connecting said electrode bearing walls together along opposite longitudinally extending sides thereof, and at least one partition wall disposed between said sidewalls but extending generally longitudinally at an angle with sidewalls and connecting said electrode bearing walls so as to divide said duct arrangement into at least two counterflow channels of increasing width in opposite longitudinal directions, and thermally and electrically insulative lining means disposed on the inwardly facing surfaces of said side and partition walls.

4. A magnetohydrodynamic system comprising an elongated generating duct of substantially uniform lateral periphery along its length, at least one elongated partition wall supported between opposing electrode bearing walls of said duct and extending generally longitudinally of said duct so as to provide separate counterflow channels therein said partition wall having its longitudinal center line disposed at an angle to that of said duct, and an elongated magnet disposed substantially to encompass said generating duct and arranged to produce magnetic flux substantially uniformly in said duct.

5. A magnetohydrodynamic system comprising an elongated generating duct of uniform rectangular lateral periphery along its length, at least one elongated partition wall disposed substantially at right angles between opposed longitudinally extending electrode bearing walls of said duct, said partition wall extending generally longitudinally of said duct but having its longitudinal center line disposed at an angle to that of said duct so as to provide separate counterflow channels of increasing width in opposite longitudinal directions within said duct, and an elongated magnet disposed substantially to encompass said generating duct and arranged to produce magnetic flux substantially uniformly across said duct.

6. A magnetohydrodynamic system comprising an elongated generating duct of substantially uniform lateral periphery along its length, at least one elongated partition wall supported between opposing electrode bearing walls of said duct and extending generally longitudinally of said duct so as to provide separate counterflow channels therein, said partition wall having its longitudinal reference center line disposed at an angle to that of said duct, magnetic flux generating means arranged to produce magnetic flux substantially uniformly in said duct, and means for transporting an ionized fluid through said generating duct in opposite directions.

7. A magnetohydrodynamic system comprising an elongated generating duct substantially encompassed along its length by an elongated magnet arranged to produce magnetic flux across said generating duct, said generating duct having a pair of longitudinally extending and suitably insulated electrode bearing walls substantially uniformly spaced from each other along the duct length, said generating duct further having longitudinally extending and suitably insulated sidewalls uniformly spaced from each other along the duct length and connecting said electrode bearing walls together along opposite longitudinally extending sides thereof, and at least one partition wall disposed between said sidewalls but extending generally longitudinally at an angle with said sidewalls and connecting said electrode bearing walls so as to divide said duct arrangement into at least two counterflow channels of increasing width in opposite longitudinal directions, and means for transporting an ionized gas through said generating duct in opposite directions.

8. A magnetohydrodynamic system comprising an elongated generating duct substantially encompassed along its length by an elongated magnet arranged to produce magnetic flux substantially uniformly across said generating duct, said generating duct having a pair of longitudinally extending and suitably insulated electrode bearing walls substantially uniformly spaced from each other along the duct length, said generating duct further having longitudinally extending and suitably insulated sidewalls uniformly spaced from each other along the duct length and connecting said electrode bearing walls together along opposite longitudinally extending sides thereof, and at least one partition wall disposed between said sidewalls but extending generally longitudinally at an angle with said sidewalls and connecting said electrode bearing walls so as to divide said duct arrangement into at least two counterflow channels of increasing width in opposite longitudinal directions, and separate electrode means disposed respectively on each of said electrode bearing walls in each of said channels.

9. A magnetohydrodynamic system comprising an elongated generating duct of substantially uniform lateral periphery along its length, at least one elongated partition wall supported between opposing electrodes bearing walls of said duct and extending generally longitudinally of said duct so as to provide separate counterflow channels therein, said partition wall having its longitudinal center line disposed at an angle to that of said duct, and magnetic flux generating means arranged to produce magnetic flux substantially uniformly in said duct.

References Cited by the Examiner
UNITED STATES PATENTS
3,162,781   12/1964   Beckwith _____ 310—11

MILTON O. HIRSHFIELD, *Primary Examiner.*
D. X. SLINEY, *Assistant Examiner.*